(12) United States Patent
Castillo et al.

(10) Patent No.: US 6,550,812 B1
(45) Date of Patent: Apr. 22, 2003

(54) MAGNETIC WRITE/ERASE BINDER

(75) Inventors: Arthur G. Castillo, Chino Hills, CA (US); Christine K. Hibberd, Irvine, CA (US); Terri L. McKelvaine, Meridian, MS (US); Edward Podosek, Wilbrahan, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/077,492

(22) Filed: Feb. 15, 2002

(51) Int. Cl.$^7$ ................................................. B42D 3/00
(52) U.S. Cl. ............................ 281/37; 281/39; 281/51; 281/29; 402/4; 402/73; 402/80 R; 402/503
(58) Field of Search ................................ 281/15.1, 21.1, 281/29, 36, 37, 39, 38, 45, 51; 434/305, 410; 402/4, 73, 80 R, 503

(56) References Cited

U.S. PATENT DOCUMENTS

| | | |
|---|---|---|
| 2,663,095 A | 12/1953 | Chase |
| 2,879,609 A | 3/1959 | Watkins |
| RE25,363 E | 4/1963 | Tate |
| 3,426,453 A | 2/1969 | Dingwall et al. |
| 3,460,276 A | 8/1969 | Payne |
| 3,579,871 A | 5/1971 | Eddington |
| 3,982,334 A | 9/1976 | Tate |
| 4,143,472 A | 3/1979 | Murata et al. |
| 4,232,084 A | 11/1980 | Tate |
| 4,398,893 A | * 8/1983 | Johns .......................... 434/305 |
| D287,254 S | * 12/1986 | Story ........................... D19/26 |
| 5,034,754 A | 7/1991 | Taylor et al. |
| 5,057,363 A | 10/1991 | Nakanishi |
| 5,115,330 A | 5/1992 | Nobile et al. |
| 5,411,398 A | 5/1995 | Nakanishi et al. |
| 5,857,797 A | 1/1999 | Streff et al. |
| 5,949,050 A | 9/1999 | Fosbenner et al. |
| 6,092,294 A | * 7/2000 | Mak ............................ 46/131 |

FOREIGN PATENT DOCUMENTS

GB 2034640 A 6/1980

* cited by examiner

*Primary Examiner*—Willmon Fridie, Jr.
(74) *Attorney, Agent, or Firm*—Oppenheimer Wolff & Donnelly LLP

(57) ABSTRACT

A binder, such as a three ring binder, is provided with a magnetizable panel on the front cover of the binder and with a stylus and a permanent magnet erasing device mounted onto the binder. The magnetizable panel may be inset into the cover of the binder, or it may constitute substantially the entire front cover of the binder, or it may be inserted into a transparent pocket on the front cover of the binder. The eraser may be of a broad area permanent magnet type which may be brought into engagement with the entire magnetizable panel; or a smaller linear permanently magnetized eraser may be employed.

21 Claims, 4 Drawing Sheets

MAGNETIC WRITE/ERASE BINDER

FIELD OF THE INVENTION

This invention relates to binders and to magnetic write/erase assemblies.

BACKGROUND OF THE INVENTION

A number of toys have been proposed using magnetic write/erase assemblies. These toys characteristically have an upper translucent plastic sheet and a lower plastic sheet bonded together at the edges thereof, with a viscous material, such as a gel or thick fluid between the two sheets, and particulate magnetic material dispersed in the viscous material. A magnetic stylus is provided to write on the assembly by engaging the stylus to the upper surface of the assembly. Magnetic particles are drawn to the upper surface providing a visual image; and a large area magnet or an extended linear magnet is moved across the lower surface of the assembly to erase the image. The assembly may be divided into cells in order to maintain substantially uniform distribution of magnetic particulate material throughout the assembly.

A number of prior art patents disclose specific constructions for write/erase magnetic assembly boards, and these include the following: U.S. Pat. Nos. 4,643,684; 4,804,327; 5,018,979; 5,057,363; 5,151,032; 5,411,398; 3,426,453; 5,112,229; 5,295,837; U.S. Reissue Pat. No. 25,363 and U.S. Pat. No. 3,426,453.

Toys involving the type of magnetic write erase assemblies disclosed in the foregoing patents are available in toy stores. Such toys are provided with magnetic styli and integral mechanical erase arrangements, with the resultant assemblies being in the order of a half inch or more in thickness.

SUMMARY OF THE INVENTION

In one specific illustrative embodiment of the invention, a three ring type binder for holding papers is provided with a cover which has an exposed magnetic read/write panel which is relatively thin, such as one tenth of an inch (0.10 inch) or less; and secured to the binder are a permanent magnetic stylus, and an extended permanent magnet eraser. The stylus and the extended permanent magnet eraser are removably mounted onto the binder structure so as not to impair the normal capability of the three ring binder.

Various features which may be included in the binder include the following:

1. The extended permanent magnet erasing may be accomplished using a permanent magnet sheet, preferably mounted in the rings of the three ring binder, so that it may be shifted into engagement with the rear of the magnetizable panel for erasing.

2. The permanent magnet eraser may be elongated and may be one inch up to several inches long, and may be mounted on the inside of one of the covers of the binder for easy access.

3. The magnetizable panel may be inserted into the transparent pocket of a binder such as that shown in U.S. Pat. No. 5,857,797.

4. The magnetizable panel may form substantially the entire front cover of the binder.

5. The binder may be of any conventional configuration for holding papers, and need not be a conventional three ring binder.

6. The magnetic writing stylus may be mounted on the spine of the binder, or on the inner surface on one of the covers of the binder so that it does not unduly expand the size of the binder.

7. The permanent magnet writing stylus may be structurally combined with a magnetic eraser.

Other objects, features and advantages of the invention will become apparent by consideration of the following detailed description and the accompanying drawings.

DETAILED DESCRIPTION OF THE PREFERRED EMBODIMENTS

While the specification describes particular embodiments of the present invention, those of ordinary skill can devise variations of the present invention without departing from the inventive concept.

Figure 1:
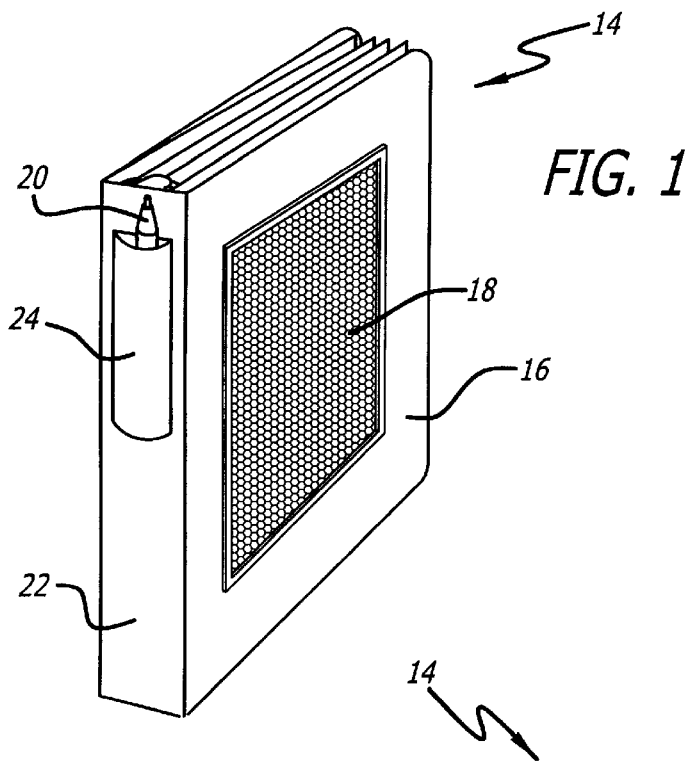
FIG. 1 is a perspective view of a 3-ring binder illustrating the principles of the invention.

Referring more particularly to the drawings, FIG. 1 is a perspective view of a 3-ring binder 14 having a front cover 16 into which a magnetizable panel 18 has been mounted. A magnetic stylus 20 is mounted on the spine 22 of the binder 14 with an integral pouch 24.

Figure 2:
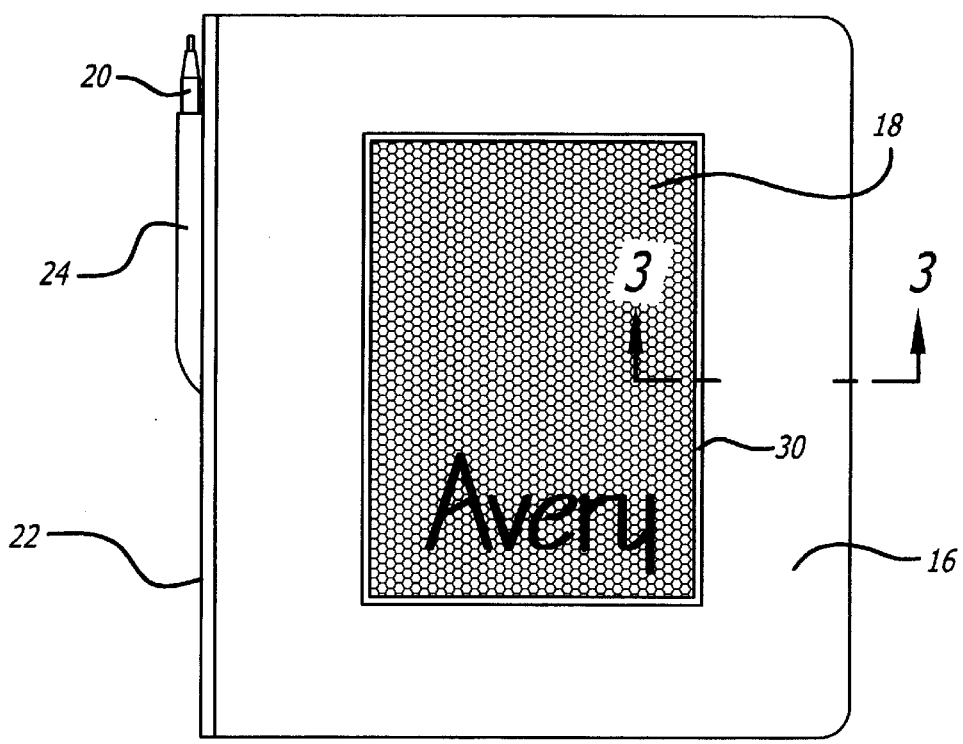
FIG. 2 is a front view of the binder of FIG. 1 showing the read/write erase panel, and the magnetic stylus.

FIG. 2 is a front view of the binder 14, with the reference numerals identifying corresponding parts.

Figure 3:
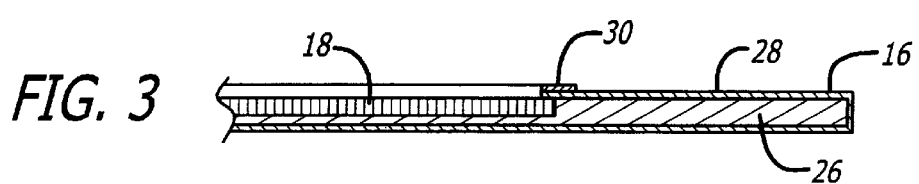
FIG. 3 is a partial cross-sectional view taken along line 3—3 of FIG. 2.

FIG. 3 is a schematic cross-sectional view taken along lines 3—3 of FIG. 2. As shown in FIG. 3 the cover 16 of the binder 14 has a central stiff panel 26 which may be formed of a chip board covered with a thin layer of plastic material 28. The magnetizable panel 18 may be recessed into the cover 26, and may have a thin layer of tape 30 to hold it firmly in place.

Figure 4:
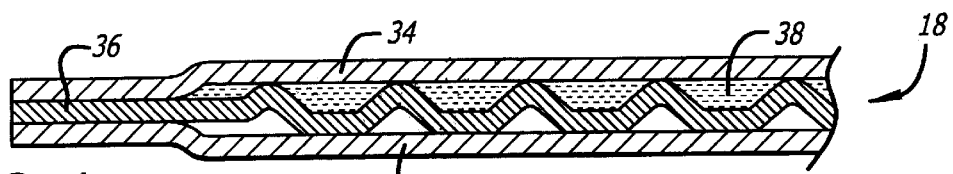
FIG. 4 is a schematic cross-sectional view of one embodiment of a read/write magnetizable panel.

The magnetizable panel 18 may be in any of a number of specific physical configurations, with one panel 18 shown in FIG. 4 corresponding to the panel shown in U.K. Pat. Application 2034640A filed Sep. 14, 1979. The exemplary panel shown in FIG. 4 includes an upper flat transparent or translucent plastic layer 34, and a second layer of plastic material 36 into which a plurality of pockets have been formed. Within the pockets between the layers 34 and 36 is high viscosity or gel like material 38 in which magnetizable material is suspended. With the panel 18 including a large number of spaced pockets, the particulate magnetic material is blocked from drifting down to one edge of the entire panel. Instead, the magnetizable material is distributed across the surface of the panel so that some of the magnetic particulate material is available to respond and to be drawn up against the upper translucent or transparent panel 34 when the stylus is moved into engagement with the upper panel 34. The lower panel 40 is optional and may not be needed when stiffness or semi-rigidity of the two panels 34 and 36 is sufficient. Incidentally, the thickness of the layers in the showing of FIG. 4 has been exaggerated and the total thickness of the panel would normally be about 0.10 inch or less, with each plastic sheet being only a few thousandths of an inch thick.

Figure 5:
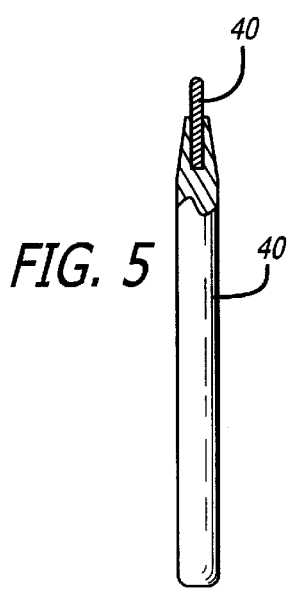
FIG. 5 is a partial cross-sectional view of a stylus showing a small permanent magnet at one end thereof.

FIG. 5 shows a stylus 42 which may be formed of plastic material, with a permanent magnet 44, preferably having a rounded tip, extending from one end of the stylus. In order to erase the writing which appears on the magnetizable panel as a result of application of the stylus, a magnetic field is applied to the lower surface of the panel. This may be accomplished by the application of a permanent magnet in the form of a permanently magnetized sheet 46 secured to a plastic sheet 48 to which a handle 50 is pivotally mounted at pivot points 52 and 54. The resultant flat eraser assembly may be mounted on one of the covers of the binder.

Figure 6:
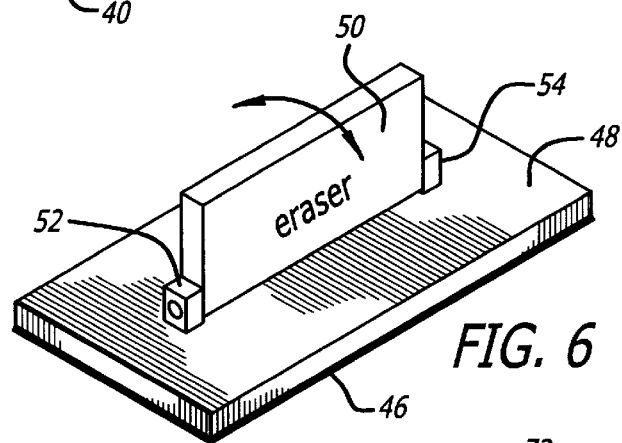
FIG. 6 is a perspective view of a broad area permanent magnet which may be used either for erasing by engaging the permanent magnet surface with the backside of the magnetizable panel or for darkening broad areas on the front, writing side of the panel.

In practice, therefore, a stylus such as the stylus 42 engages the upper surface of a magnetizable panel such as the panel 18, and magnetic particles are drawn up into engagement with the inner surface of the translucent panel 34, thereby providing a visual image. When it is desired to erase the image, the permanent magnet eraser unit as shown in FIG. 6, is applied to the lower surface of the panel 18, to pull the magnetic particles away from the upper surface 34, thereby wiping out the image.

Alternative forms of permanent magnet erasers are shown in FIGS. 7, 8, 9 and 10. More specifically, the eraser shown in FIG. 7 includes a permanent magnet 62 with pole pieces of magnetizable material 64 and 66.

Figure 7:
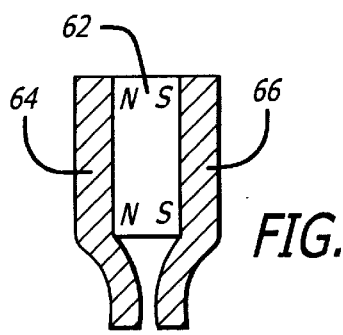
FIG. 7 is a cross-section of a linear erasing magnet, with a side view of the erasing magnet of FIG. 7 being shown in FIG. 8.
Figure 8:
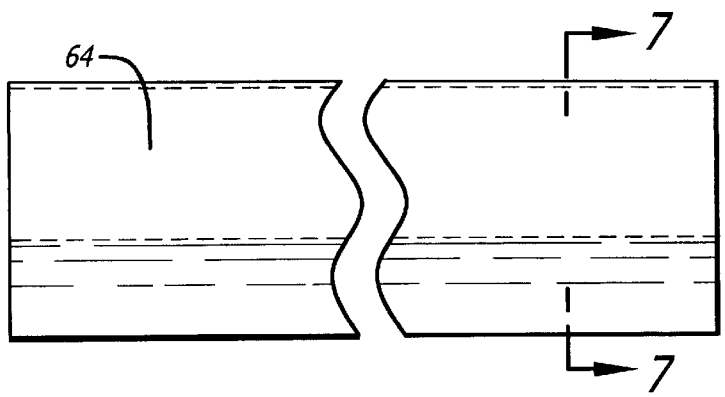
FIG. 8

FIG. 8 is a side view of the eraser of FIG. 7 with only the pole piece 64 being visible in this showing.

Figure 9:
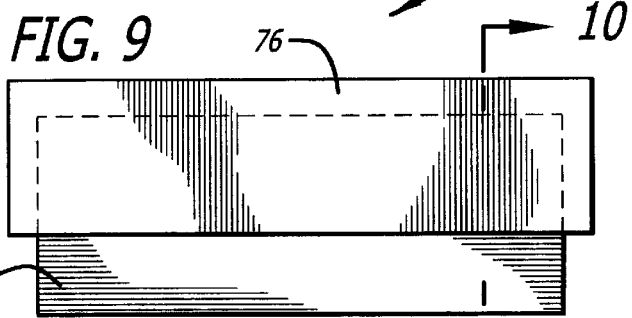
FIG. 9 shows a simple linear eraser.
Figure 10:
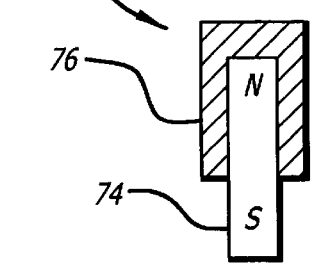
FIG. 10 is a cross-sectional view taken along lines 10—10 of FIG. 9.

FIG. 9 is a side view of an alternative linearly extending eraser 72 which includes a rectangular elongated permanent magnet 74 and an outer U-shaped plastic layer 76 which covers the upper portion of the magnetic eraser. Incidentally, the cross-sectional view of FIG. 10 is taken along lines 10—10 of FIG. 9.

Figure 11:
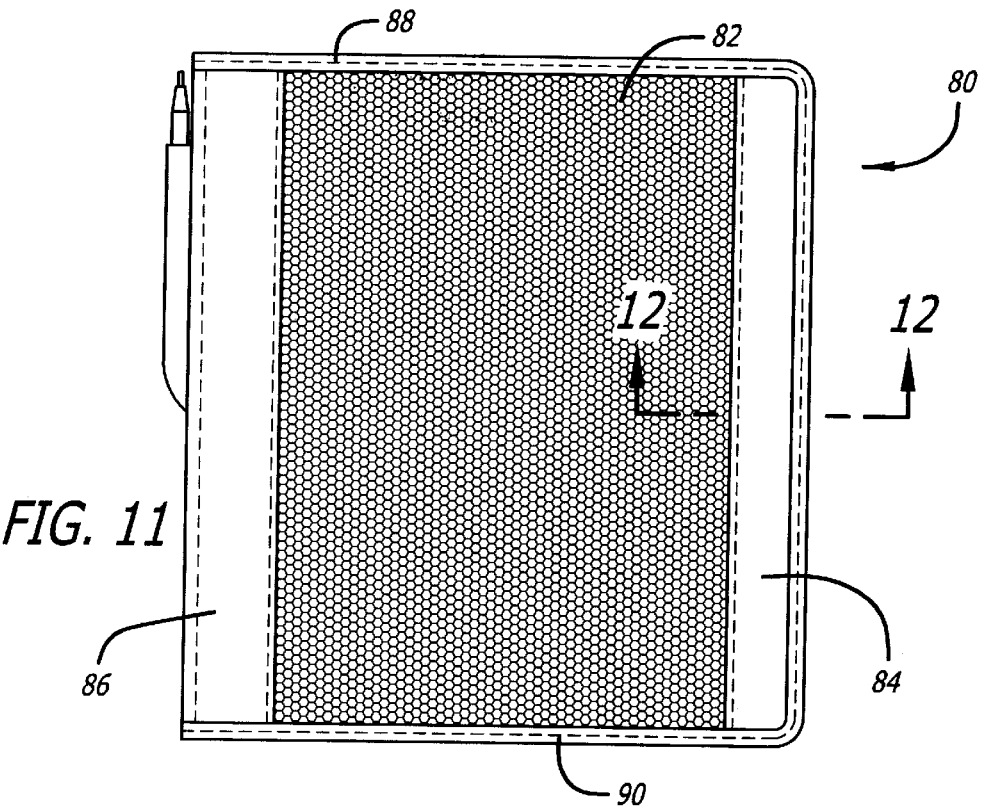
FIG. 11 is a front view of a binder where the magnetizable panel constitutes most of the front cover of the binder.

Referring now to FIG. 11 of the drawings, this is a front view of a binder 80 in which the magnetizable panel 82 constitutes virtually all of the front cover of the binder. The outer edges 84, 86, 88 and 90 of the binder are fabric material and they are stitched into the outer edges of the panel 82 where the top and bottom surfaces are bonded together.

Figure 12:
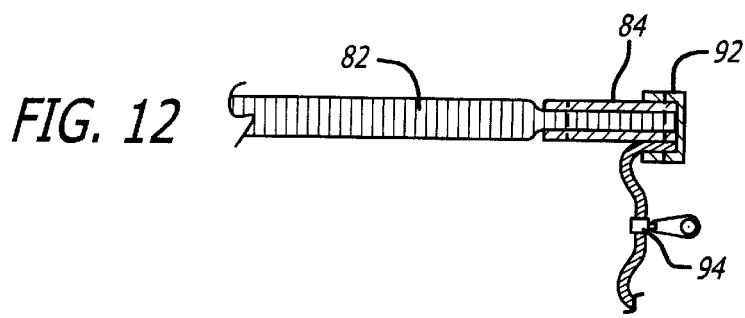
FIG. 12 is a partial cross-sectional view of the front cover of the binder taken along lines 12—12 of FIG. 11.

FIG. 12 is a cross-sectional view of the top cover and edge treatment of the binder of FIG. 11 taken along lines 12—12 of FIG. 11. In FIG. 12, the magnetizable panel 82 is stitched to the outer cloth binding at reference number 84, with the edge beading of the binder being indicated at reference numeral 92. The zippered closure of the binder 80 is indicated at reference number 94.

Figure 13:
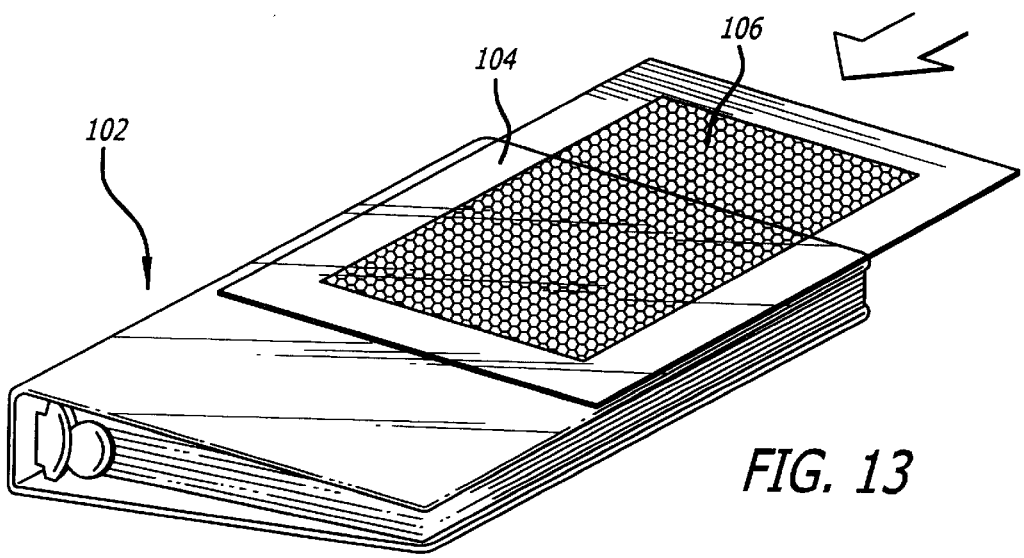
FIG. 13 is a perspective view showing a magnetizable panel being inserted into a transparent pocket in a prior art type binder.

FIG. 13 shows a binder 102 of the type shown in U.S. Pat. No. 5,857,797 in which the front cover has a transparent pocket 104 which is intended to receive images such as photographs and the like. In this embodiment, the read/write magnetic panel is mounted in the pocket formed between the transparent window 104 and the main stiff portion of the binder cover.

Figure 14:
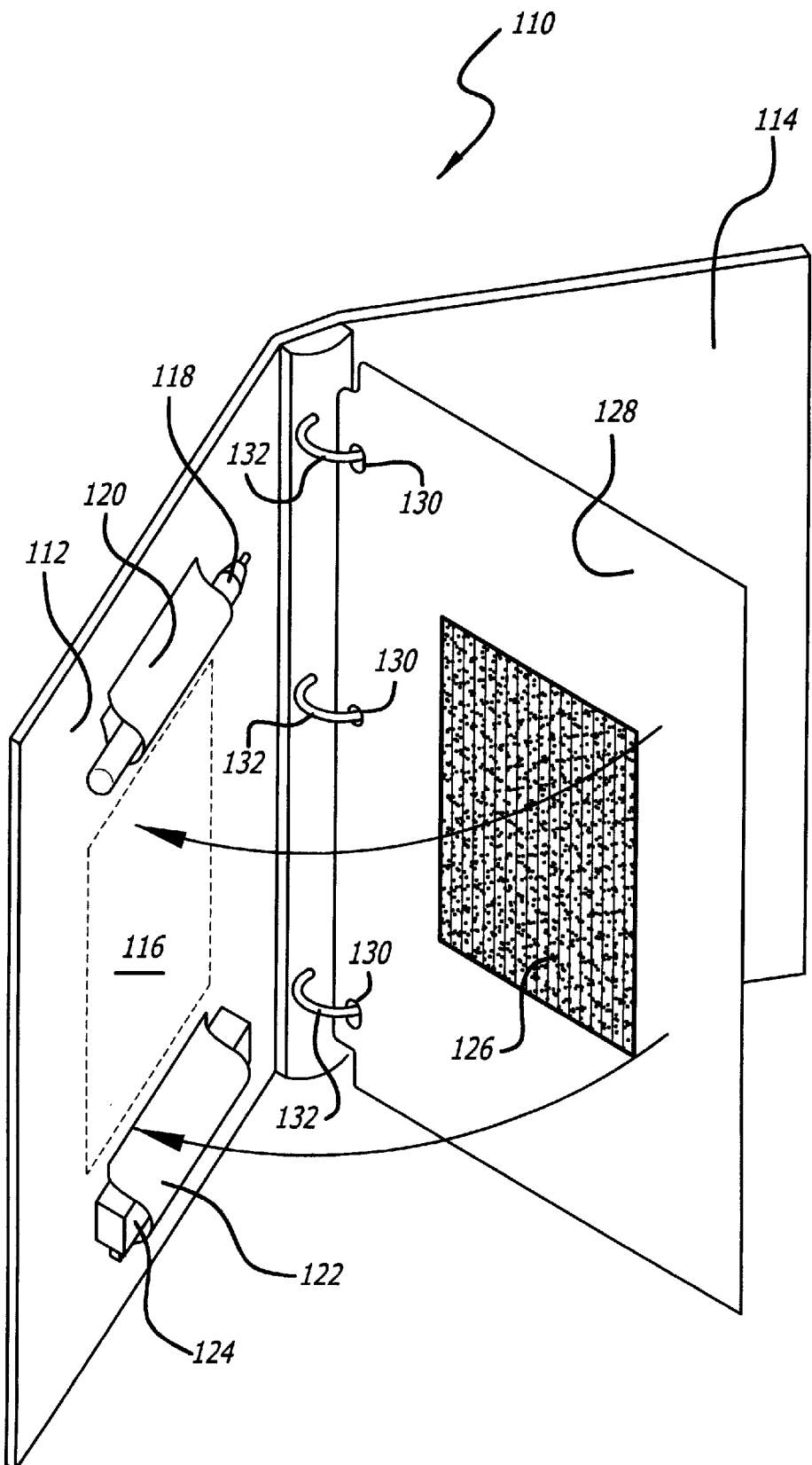
FIG. 14 is a perspective view of another binder illustrating the principles of the invention in which a broad area erasing magnet is mounted to the rings of the 3-ring binder.

Referring now to FIG. 14 of the drawings, the binder 110 includes a front cover 112, and a rear cover 114. The area 116 which is defined by dashed lines, refers to the location of a magnetizable panel such as the panel 18 as shown in FIG. 1 of the drawings. The stylus 118 is mounted in a stylus holder 120 well above the area 116 where the magnetizable panel is located. Below the area 116 is an additional holder 122 in which the elongated permanent magnet eraser 124 may be mounted. Alternatively, a pen or other conventional writing instruments may be mounted in an appropriately sized pouch 122. A large area permanent magnet 126 is mounted on the flexible plastic panel 128, which in turn is mounted through the apertures 130 to the rings 132 of the binder 110. When the mounting sheet 128 is folded toward the front cover 112, with the permanent magnet material 126 directly overlying the area 116, the permanent magnet material 126 may be pressed forward into engagement with the inner surface of the front cover 112 of the binder, overlying area 116, thereby erasing any image previously written onto the magnetizable panel on the front of the binder. Normally, the panel 128 is spaced somewhat apart from the front cover 112, by the presence of the stylus 118 and the lower pouch 122 on the inner cover 112 of the binder 110. However, the mounting sheet 128 for the permanent magnet eraser 126 is sufficiently flexible that it may be bent slightly permitting engagement of the permanent magnet 126 with the interior surface 116 of the front cover 112 of the binder.

It is noted in passing that the patents cited hereinabove indicate the types of materials which may be employed for the magnetizable binder panel per se. High strength permanent magnet material may be made of known ferrite materials, or any other known high strength magnetic materials.

In the foregoing detailed description several specific embodiments of the invention have been described in some detail. It is to be understood, however, that various changes and modifications may be made by those skilled in the art. Thus, by way of example and not of limitation, different materials for the top and bottom and sheets of the magnetizable panels, as well as different materials for the high viscosity or gel like contents of the panel, and the magnetic particulate material, may be employed, with reference being made to the cited patents. As indicated, the magnetizable panel may constitute the entire front cover of the binder, or may be of a smaller size, occupying only a portion of the area of the front cover of the binder. The permanent magnet stylus and the permanent magnet eraser may be located in any desired location on the binder either on the outer covers or spine, or on the inside surface of the front or rear covers. If desired, the stylus and the eraser may be mounted along the outer edge of the binder so that there is no reduction in the amount of paper or sheets of paper which may be contained within the binder. The binders may be of any of the known types of binders, including those with fairly stiff covers, and those where the covers are quite thin and are semi flexible.

With regard to the construction of the magnetizable panels, although the panels as shown in the present drawings are indicated as being segmented or compartmentalized, this construction is not necessary if the magnetizable material is maintained substantially uniformly distributed across the panel. Preferred magnetizable panels using a micro-encapsulative construction to avoid the need for compartmentalization, are available from a company identified as "China Zhejiang 001 Electronic Group Co. Ltd." of Zhejiang Province, China.

Concerning other alternatives or variations, it is noted that the magnetic panels may be on either or both the front cover or back cover of the binders. For private reminder notes, for example a magnetizable panel mounted on the rear cover could have its writing surface on the inside of the rear cover. It is noted that the cited prior art references disclose various alternatives including the use of permanently magnetized movable elements in the panel with north and south polarized writing styli; and many other alternatives, any of which may be incorporated into the present binder assemblies. Erasing may be accomplished from the front in some embodiments. It is also noted that when the term "translucent" is used, it includes "transparent" materials. In addition to applicability to common three ring binders the invention is applicable to other types of binders for papers, including binders with posts for holding papers and binders where the sheets are held together with spiral, spring like coils. Concerning the thickness of the magnetic panels, successful binder assemblies have used magnetic panels which are about 80 thousandths (0.080) of an inch thick. More generally, it is desirable to have binders as thin as possible, less than ¼ inch thick and preferably less than one tenth (0.10) inch thick. If desired, a single stylus may be provided with both writing and erasing capabilities, using, for example, an extended magnet on the side thereof, or appropriate north and south poles at different locations on the stylus. The extended linear erasing arrangements may be an inch or more in length, and the width may be one half or less than the length.

Accordingly, the present invention is not limited precisely to the embodiments shown in the drawings and is described in detail hereinabove.

What is claimed is:

1. A binder assembly with a magnetizable write/erase cover comprising:
    a binder with front and rear covers and an intermediate spine; said covers being pivotally mounted with respect to one-another;
    a paper retention construction for releasably holding sheets of paper within said binder, mounted at said spine;
    at least one of said covers having a substantially flat magnetizable write/erase panel mounted thereon;
    said write/erase panel having inner and outer sheets, viscous material between said sheets, and particulate magnetic material dispersed in said viscous material;
    said outer sheet being translucent,
    a magnetic stylus for applying a magnetic force to said outer sheet to draw said particulate magnetic material to said translucent outer sheet to create an image;
    a magnetic eraser for application to said write/erase panel to erase any image appearing on said outer surface;
    said binder having retaining arrangements for mounting said magnetic stylus and said magnetic eraser onto said binder; and
    said magnetic stylus and said particulate material cooperating to produce line images on said panel following the path of said stylus on said magetizable panel, to permit the user to write messages and draw images on said magnetizable panel.

2. A binder assembly as defined in claim 1, wherein stylus is mounted on said spine.

3. A binder assembly as defined in claim 1, wherein said magnetizable panel forms the greater part of said front cover.

4. A binder as defined in claim 1, wherein said magnetizable panel is mounted in a transparent pocket on the front cover of said binder.

5. A binder as defined in claim 1, wherein said magnetic eraser is substantially the same size as said magnetizable panel.

6. A binder assembly comprising:
    a front cover;
    a rear cover hingedly coupled to said front cover;
    a paper retention construction for releasably holding papers within said binder;
    a magnetizable panel forming at least part of one of said covers;
    a magnetic stylus for writing on or forming an image on said panel;
    a magnetic eraser for application to said magnetizable panel to clear any writing or image on said panel, and
    said magnetic stylus and said particulate material cooperating to produce line images on said panel following the path of said stylus on said magetizable panel, to permit the user to write messages and draw images on said magnetizable panel.

7. A binder assembly as defined in claim 6, wherein said magnetizable panel forms the greater part of said front cover.

8. A binder as defined in claim 6, wherein said magnetizable panel is mounted in a transparent pocket on the front cover of said binder.

9. A binder as defined in claim 6, wherein said magnetic eraser is substantially the same size as said magnetizable panel.

10. A binder as defined in claim 6, wherein both said magnetic stylus and said magnetic eraser are mounted on the inner surface of said front cover.

11. A binder as defined in claim 6, wherein said eraser includes a plate of permanently magnetizable material.

12. A binder assembly comprising:
    a front cover;
    a rear cover hingedly coupled to said front cover;
    a paper retention construction for releasably holding papers within said binder;
    a magnetizable panel forming at least part of one of said covers;
    a magnetic stylus for writing on or forming an image on said panel;
    said assembly including magnetic arrangements for application to said magnetizable panel to clear any writing or image on said panel, and
    said magnetic stylus and said particulate material cooperating to produce line images on said panel following the path of said stylus on said magetizable panel, to permit the user to write messages and draw images on said magnetizable panel.

13. A binder assembly as defined in claim 12, wherein said magnetizable panel forms the greater part of said front cover.

14. A binder assembly as defined in claim 12, wherein the magnetizable panel is less than one tenth (0.10) of an inch thick.

15. A binder assembly comprising:

a front cover;

a rear cover hingedly coupled to said front cover;

a paper retention construction for releasably holding papers within said binder;

a magnetizable panel forming at least part of one of said covers;

a magnetic stylus for writing on or forming an image on said panel;

a magnetic eraser for application to said magnetizable panel to clear any writing or image on said panel;

said binder having retaining arrangements for mounting said magnetic stylus and said magnetic eraser onto said binder; and said magnetic stylus and said particulate material cooperating to produce line images on said panel following the path of said stylus on said magetizable panel, to permit the user to write messages and draw images on said magnetizable panel.

16. A binder assembly comprising:

a front cover;

a rear cover hingedly coupled to said front cover;

a paper retention construction for holding papers within said binder;

a magnetizable panel forming at least part of one of said covers;

a magnetic stylus for writing on or forming an image on said panel;

a magnetic eraser for application to said magnetizable panel to clear any writing or image on said panel; and said magnetizable panel being magnetically exposed both to the front of said binder, and at the inner surface of the front cover of said binder.

17. A binder assembly comprising:

a front cover;

a rear cover hingedly coupled to said front cover;

a paper retention construction for holding papers within said binder;

a magnetizable panel forming at least part of one of said covers;

a magnetic stylus for writing on or forming, an image on said panel;

said assembly including magnetic arrangements for application to said magnetizable panel to clear any writing or image on said panel; and said magnetizable panel being magnetically exposed both to the front of said binder, and at the inner surface of the front cover of said binder.

18. A binder assembly comprising:

a front cover;

a rear cover hingedly coupled to said front cover;

a paper retention construction for holding papers within said binder;

a magnetizable panel forming at least part of one of said covers;

a magnetic stylus for writing on or forming an image on said panel;

a magnetic eraser for application to said magnetizable panel to clear any writing or image on said panel; and said eraser including a permanent magnet and overlying plastic material for gripping said eraser.

19. A binder assembly with a magnetizable write/erase cover comprising:

a binder with front and rear covers and an intermediate spine;

a paper retention construction for holding sheets of paper within said binder mounted at said spine;

at least one of said covers having a substantially flat magnetizable write/erase panel mounted thereon;

said write/erase panel having inner and outer sheets, viscous material between said sheets, and particulate magnetic material dispersed in said viscous material;

said outer sheet being translucent, a magnetic stylus for applying a magnetic force to said outer sheet to draw said particulate magnetic material to said translucent outer sheet to create an image;

a magnetic eraser for application to said write/erase panel to erase any image appearing on said outer surface;

said binder having retaining arrangements for mounting said magnetic stylus and said magnetic eraser onto said binder; and said magnetic eraser being substantially the same size as said magnetizable panel, and said magnetic eraser being mounted on said paper retention construction for movement toward and away from said magnetizable panel.

20. A binder assembly comprising:

a front cover;

a rear cover hingedly coupled to said front cover;

a paper retention construction for holding papers within said binder;

a magnetizable panel forming at least part of one of said covers;

a magnetic stylus for writing on or forming an image on said panel; and a magnetic eraser for application to said magnetizable panel to clear any writing or image on said panel; and said magnetic eraser being substantially the same size as said magnetizable panel, and said eraser being mounted on said paper retention construction for movement toward and away from said magnetizable panel.

21. A binder assembly as defined in claim 1 wherein said paper retention construction is a 3-ring mechanism which may be opened and closed to insert and remove pages.

* * * * *